United States Statutory Invention Registration [19]

[11] Reg. Number: H355

Skelton et al. [43] Published: Oct. 6, 1987

[54] APPARATUS AND METHOD FOR STIRRING FLUID BORNE PARTICLES

[75] Inventors: Earl F. Skelton, Washington, D.C.; William T. Elam, Alexandria, Va.; Alan W. Webb, Oxon Hill, Md.

[73] Assignee: United States of America, Washington, D.C.

[21] Appl. No.: 890,201

[22] Filed: Jul. 2, 1986

[51] Int. Cl.[4] ..... G01N 23/20; G21K 5/08

[52] U.S. Cl. ..... 378/80; 378/66

[56] References Cited

PUBLICATIONS

Magnetic Stirrer for Diamond-Anvil Cells, by E. F. Skelton, W. T. Elam and A. W. Webb and S. B. Qadri, a paper presented at the Xth Int'l High Pressure Conf., in Amsterdam, The Netherlands, held on 8-11 Jul. 1985.

*Primary Examiner*—Stephen C. Buczinski
*Assistant Examiner*—Linda J. Wallace
*Attorney, Agent, or Firm*—Robert F. Beers; Sol Sheinbein; Andrew M. Lesniak

[57] ABSTRACT

Specimen particles in pressurized liquid sea are reoriented by magnetic stirring as a magnetic field surrounding the particles changes direction and the particle reorient themselves to respond to the change. Nonmagnetic particles as well as magnetic particles can be reoriented by simply including magnetic particles along with the nonmagnetic particles in the sea so that the magnetic particles collide with the nonmagnetic particles or attach to them so as to reorient them (individual particles) as they themselves reorient is response to change in direction of the magnetic field.

18 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
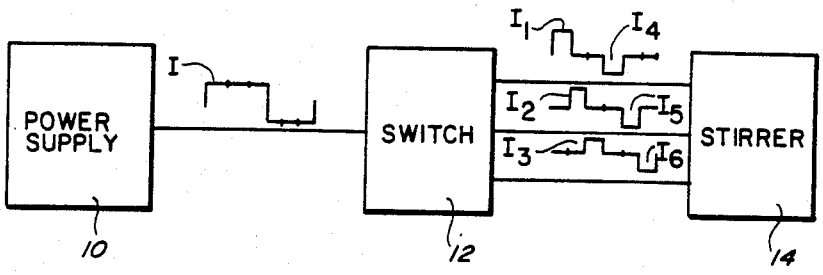
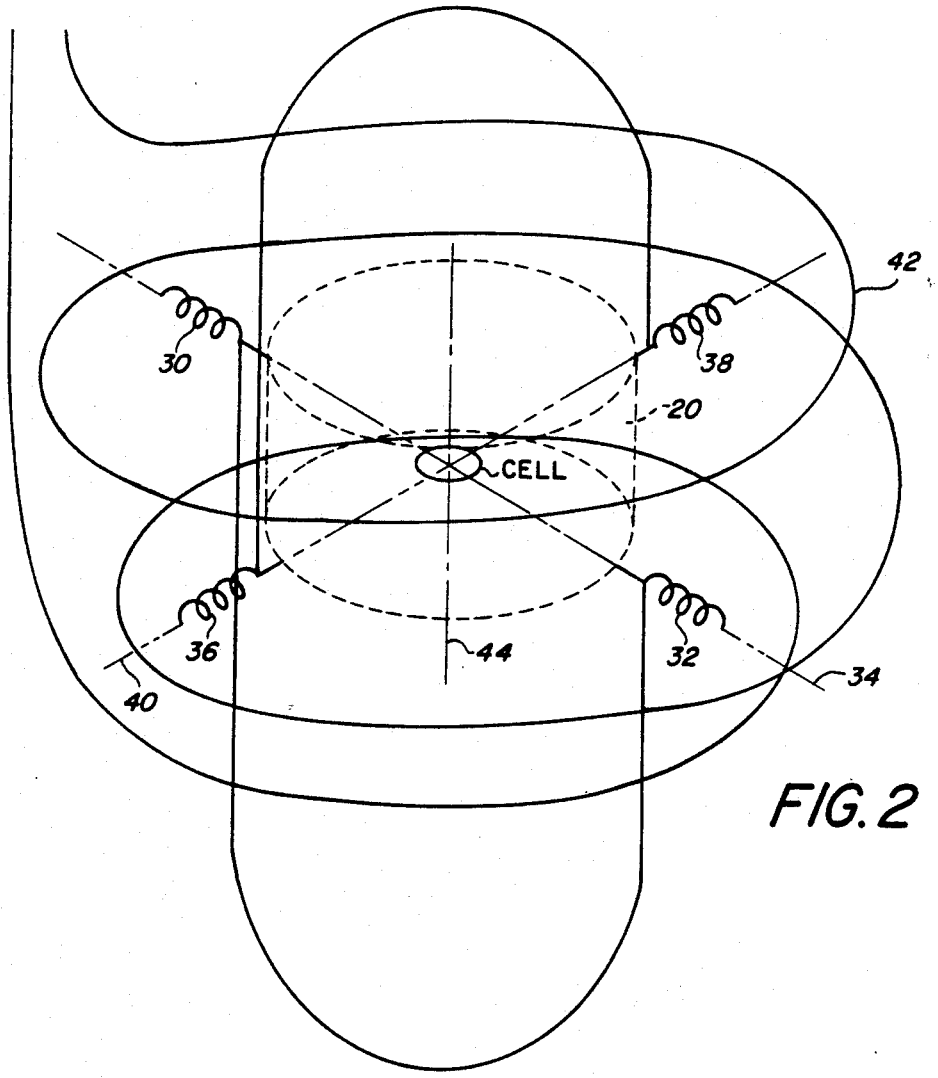
FIG. 2

APPARATUS AND METHOD FOR STIRRING FLUID BORNE PARTICLES

The invention relates to a technique for stirring particles in an encapsulated fluid, and particularly relates more to a technique for randomizing orientations of many tiny particles populating a small pool of encapsulated liquid in a pressure and light permeable cell.

BACKGROUND OF THE INVENTION

The objective of optical ray powder diffractometry is to expose numerous randomly oriented crystallite particles to a pencil beam of incident electromagnetic radiation to acquire data about the particles from the beam rays reflected by the particles. Variation in crystallite lattice constant, d, with variation in hydraulic pressure in the fluid hosting the crystallites can be measured through data impressed on the beam by randomly oriented crystallites, or small crystalline particles, suspended in a pool of fluid encapsulated in a sealed cell known as a diamond anvil cell.

H. Iwasaki, Japan J. Appl. Phy. 17, (1978) 1905 introduces a technique in which a cell containing a sample of polycrystalline material in finely divided powder form in a host liquid is continuously rotated about one or more axes while data on an optical beam is recorded after the beam passes through the sample cell. A serious drawback of this technique is that a center of rotation must be fixed in space to an accuracy of less than 0.1 mm; a difficult task indeed.

Simultaneously and sequentially exposing a multitude of randomly oriented crystallites (finely divided crystals of microscopic size in an encapsulated fluid) to a narrow column beam of incident electromagnetic radiation (e.g. parallel x-rays) involves considerable time and effort.

Formidable pressures on crystallites crowded in a host liquid are attained, and held, in a diamond-anvil cell during probing of the crystallites by a narrow pencil beam of radiation because the cell's pressure chamber dimensions are small; typically the chamber diameter is a few hundred micrometers or less. Optically-transparent diamond anvils seal opposite ends of a small drilled bore in a Berylium Copper (Be Cu) gasket with a small pool of host liquid containing hundreds of thousands of crystallites, or tiny crystalline particles.

An insufficient number of liquid borne crystallites in the incident electromagnetic (x-ray) beam during exposure of the particles is not uncommon, and grainy or spotted rings on a record film exposed to the beam, results. This nonideal situation worsens when the collective crystallites suspended in the host liquid show effects of preferred crystallite orientations which arise when non-hydrostatic stress components are present in the pressure field acting on the discrete, individual crystallites. Both phenomena can, and do, give rise to abnormal intensities of the various reflections of light rays projected onto the film by the crystallites. This problem has been addressed by oscillating a cell about an axis coincident with the beam incident on the particles suspended in the cell, as mentioned earlier, during the measuring of crystalline lattice constant variation as a function of pressure applied to the particles. Further randomization of crystallite orientation could be obtained by simultaneously rotating the cell about the incident beam axis. However, considerable care would have to be exercised to keep the scattering center fixed during this motion.

SUMMARY OF THE INVENTION

Accordingly, an object of the invention is to effect particle stirring within a diamond anvil cell.

Yet another object of the invention is to provide a stirrer to reorient particles borne by liquid in a pool without having to move a diamond anvil cell containing a sample of particles.

Yet another object of the invention is to provide a technique for reorienting both nonmagnetic and magnetic particles suspended in a host fluid, or for reorienting only magnetic particles in a host fluid by imposing magnetic flux on the particles and repeatedly changing direction of the flux so as to stir the particles.

Still another object of the invention is to provide a stirrer to reorient particles borne by encapsulated liquid without having to maintain stability of pressure cell center to within 0.1 millimeter.

Still another object of the invention is to provide a technique using magnetic flux to achieve all possible reorientations of powder particles (nonmagnetic or magnetic) in a very small pool of encapsulated fluid.

These and other objects of the present invention are achieved by providing a magnetic stirrer adapted for use with a diamond-anvil cell.

The invention provides a stirrer having electromagnets to provide a set of three orthogonal, time varying magnetic fields at a diamond anvil cell to continually stir the cell contents. Particles in a host fluid in the cell drift, tumble and turn as magnetic flux from the electromagnets couple magnetically to some or all particles in the host fluid.

BRIEF DESCRIPTION OF THE DRAWINGS

FIG. 1 is a block diagram of apparatus constructed according to the invention.

FIG. 2 is a diagram of electromagnets used in a stirrer according to the invention.

DESCRIPTION OF A PREFERRED EMBODIMENT OF THE INVENTION

Figure 3:
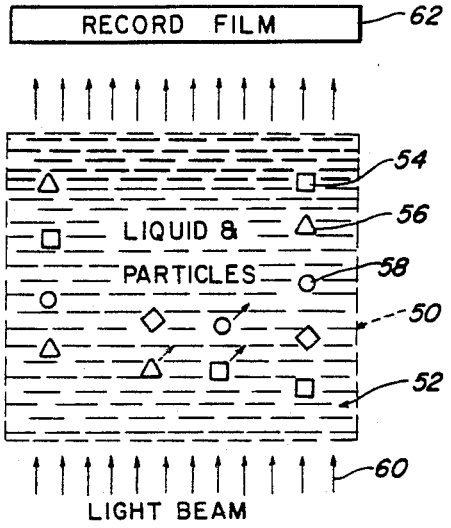
FIG. 3 is a schematic representation of liquid borne particles stirred by a technique practicing the invention.

Referring to FIG. 1 a power supply 10, a switch 12, and a stirrer 14 is illustrated. Stirrer 14 is quiescent when switch 12 is OFF, and operates when switch 12 is ON. An alternating current, I, on the order of 100 milliamps in amplitude, flows from power supply 10 to stirrer 14 when switch 12 is ON. Both positive and negative half cycles of current I occur each second. Switch 12 passes current pulses $I_1$, $I_2$, $I_3$, $I_4$, $I_5$ and $I_6$ to stirrer 14 in a timed sequence. Pulse $I_1$ is followed by pulse $I_2$, pulse $I_2$ is followed by pulse $I_3$, pulse $I_3$ is followed by pulse $I_4$, pulse $I_4$ is followed by pulse $I_5$, pulse $I_5$ is followed by pulse $I_6$, as so on, reiteratively. Current pulse $I_1$, $I_2$ and $I_3$ in this instance are each positive pulses and pulses $I_4$, $I_5$ and $I_6$, are each negative pulses. All these pulses are of identical magnitude and duration. These pulses recur at uniform intervals of one second. Stirrer 14 receives power over three input lines which forward pairs of positive and negative current pulses $I_1$, $I_4$; $I_2$, $I_5$; and $I_3$, $I_6$ to respective electromagnetic coils, schematically shown in FIG. 2.

Referring now to FIG. 2, stirrer 14 includes five electromagnetic coils arranged about the periphery of a cylindrical stirrer cavity 20 containing a CELL at its center. Magnetic flux from the electromagnetic coils causes both nonmagnetic and magnetic particles suspended in host fluid in a cell to drift, turn and tumble as magnetic coupling between the flux and the magnetic particles produce stirring of the host liquid and both nonmagnetic and magnetic particles. Horizontal coils 30 and 32 are paired coils situated along x-axis 34 and serially connected; horizontal coils 36 and 38 are paired coils situated along y-axis 40 and serially connected; and vertical coil 42 is a solitary coil situated along z-axis 44. Time spaced pulses $I_1$ and $I_4$ applied to coils 30 and 32 produce two time-spaced magnetic field fluxes having flux passing through stirrer cavity 20 parallel to x-axis 34; likewise pulses $I_2$ and $I_5$ applied to coils 36 and 38 produce magnetic field fluxes having flux passing through cavity 20 parallel to y axis 40; similarly pulses $I_3$ and $I_6$ applied to coil 42 produces magnetic field fluxes having flux parallel to z-axis 44. The magnetic flux direction in cavity 20 at any moment depends on which coils or coil are energized at that moment, and upon the direction of current flow through the coils, or coil. Overall flux direction at any moment is determined by vector addition of time concurrent magnetic flux produced by concurrently energized coils.

Coils 30, 32; 36, 38; and 42 are positioned on mutually orthogonal axes 34, 40 and 44, hence, they act together over time to produce in cavity 20 magnetic flux that changes direction in a repetitive cycle in which the field direction first parallels x-axis 34, then y-axis 40, then z-axis 44; then again parallels x-axis 34, y-axis 40, and z-axis 44, with the difference that axial direction of the flux reverses itself in alternate fashion (e.g. flux direction during pulse $I_4$ is opposite to flux direction during pulse $I_1$). Magnetic field direction change at time step intervals.

Figure 4:
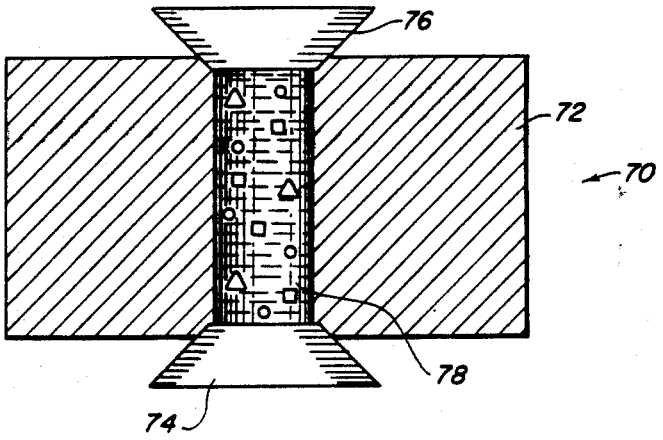
FIG. 4 is a sectionalized view of a sample cell containing particles to be stirred.

Referring now to FIG. 3, a pool 50 of encapsulated host liquid 52 is bounded by a CELL that is shown in FIG. 4. Host liquid 52 contains numerous particles, including nonmagnetic particles 54, magnetic particles 56, and calibrant particles 58. Light beam 60 entering liquid pool 50 from the bottom, penetrates host liquid 52, which is optically transparent, strikes particles 54, 56 and 58, and emerges from the top of liquid pool 50 to strike a record film 62. Nonmagnetic particles 54 are assumed to be crystallite specimen particles, magnetic particles 56 are assumed to be amorphous or noncrystalline particles, and calibrant particles 58 are assumed to be made of a crystalline substance having known variation of lattice constant, d, with field pressure. Bragg's law is used to measure lattice constant, d, of the specimen particles 54 using appropriate procedures.

FIG. 3 shows a single magnetic particle 56 in motion with the particle moving in a direction indicated by an arrow, and shows a single nonmagnetic particle 54 and a single calibrant particle 58 likewise moving in directions indicated by arrows. Magnetic particle 56 is moving in a direction determined by flux lines of a magnetic field existing in liquid pool 50. The flux lines are not shown to avoid complexity in FIG. 3. Motion of magnetic particle 56 brings about motion of particles 54 and 58.

Referring now to FIG. 4, a cell 70 situated in the center of cavity 20 awaits energization of stirrer 14. CELL 70 is made of magnetically permeable encapsulation so that magnetic flux in stirrer cavity 20 will be imposed upon the CELL's contents, namely, host liquid 52, and particles 54, 56 and 58. Nonmagnetic particles 54 present in liquid 52 need not be present in all applications involving use of stirrer 14; the stirrer will work without nonmagnetic particles 54 in the liquid, only magnetic particles 56 must be distributed throughout liquid 52. Calibrant particles 58 [e.g., sodium chloride (NaCl), molybdenum (Mo), or tungsten (W)] need not be present in all applications involving use of stirrer 14. If only magnetic particles 56 are used they must be crystalline if crystalline lattice constant is to be determined.

Cell 70 comprises a gasket 72 of nonmagnetic material e.g. Beryllium-Copper (BeCu), or any other suitable nonmagnetic material, and two nonmagnetic, optically transparent diamond anvils 74 and 76 tightly pressed into opposite sides of gasket 72 to seal opposite ends of a narrow bore 78 drilled through the gasket's center. BeCu is a hard material with good thermal properties. Diamond is a very hard material. Anvils 74 and 76 bite into the gasket around the bore 78 so that hermetic seals form by plastic deformation of gasket material. Host liquid 52 is under high pressure, typically 100,000 atmosphere of pressure. An adjustment screw (not shown) may be used to change the pressure on the host liquid by driving the diamond anvils deeper into the gasket material.

Light beam 60 directed upwardly along z-axis 44 penetrates diamond anvils 74 and 76. Beam 60 enters bore 78, strikes particles 54, 56 and 58, reflects from the particles, and leaves bore 78 carrying data impressed by the particles upon the beam.

Figure 5:
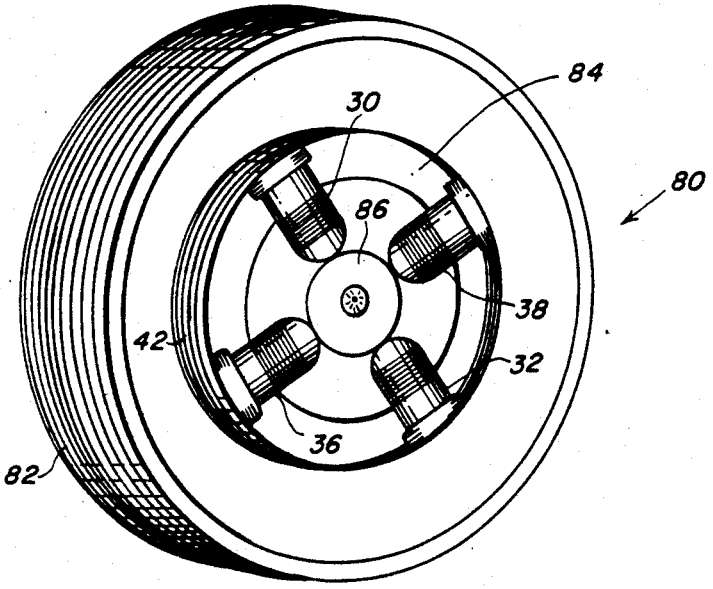
FIG. 5 is a perspective view of a portion of the stirrer of the invention.

FIG. 5 shows a component 80 of stirrer 14 from a perspective view of the underside of the component. Component 80 comprises a peripherally threaded cylinder 82 having an annular collar 84 mounted at one end, and a diamond-anvil 86 inserted through a central bore of the component to confront cavity 20 and a cell that can be placed at the cavity's center.

In FIG. 5, the four coils 30, 32; 36, 38 are shown arranged in four slots formed in the annular collar 84 made of magnetic material (e.g. soft iron) located atop the cylinder 82 of nonmagnetic material (e.g., BeCu). Coil 42 wraps about threaded collar 84 to encircle the collar and the four coils inside the collar. Each of the five coils consists of several hundred turns of 44-gauge copper transformer wire coated with a layer of electrical insulation wrapped about a soft iron core rod. Turns $N_1$, in coils 30, 32, 42 and turns $N_2$ in coils 36, 38 form ratios with turns $N_3$ in coil 42 so that turn ratios $N_1/N_3$ and $N_2/N_3$ are equal. Coil radiuses $R_{30,32}$; $R_{36,38}$; $R_{42}$ form ratios $R_{30,32}/R_{42}$ and $R_{36,38}/R_{42}$ inversely proportional to the respective turn ratios $N_1/N_3$ and $N_2/N_3$. The coil turns and coil radii ensures that when current pulses $I_1$–$I_6$ are of equal magnitude the magnetic field strength in cavity 20 (FIG. 2) remains constant each time field direction changes via sequential energization of various coils.

EXAMPLE

A powder of organic compound benzotriazol particles is mixed with iron (Fe) powder particles immersed in a host liquid alcohol; e.g. standard high pressure liquid of 96:3:1: methanol: ethanol: water, and pressurized in cell 70. An energy dispersive x-ray diffraction pattern (EDXD) is produced while a 100 milliamp current is switched sequentially through the coils at a frequency of about 1 hertz (cycle per second). Each spectrum is recorded for a period of 5 minutes. Comparison of peak intensity data taken in this fashion is compared with expected data and good correlation is found between the two. The conclusion drawn is that the coils provide a good easy method for randomizing the orientations of powder crystallite's host liquid without requiring any motion of the cell holding the sample.

The stirrer allows the tiny particles, or crystallites, in the cell chamber to be continually agitated without requiring any motion of the cell unlike the axial, rotational motions utilized in the known prior art. This particle agitation, or stirring, is accomplished by three mutually orthogonal, time sequenced, magnetic fields directed along intersecting axes meeting at the cell at the center of the stirrer cavity. Magnetic particles necessarily included in the host liquid along with crystalline particles under investigation are used to continuously stir the cell contents by systematically varying the field direction. When the sample liquid and specimen particles to be investigated includes particles that lack sufficient magnetic moment, as when the particles are strictly nonmagnetic in nature, a magnetic powder; such as $Fe_{78}B_{13}Si_9$, a glass powder of finely divided microscopically sized particles; is premixed into the liquified sample before encapsulation of the sample. If the specimen particles have only weak magnetic moment a static magnetic field can be superimposed upon them concurrently with the imposition of the direction changing magnetic field on the particles.

Liquified gas such as argon or nitrogen at low temperature (e.g., 77° Kelvin) can be used as the host fluid instead of using a pressurized liquid such as the one specified in the above example. Electromagnetic radiation that has been used contained X-rays; other possibilities are infrared, ultraviolet, visible or Raman radiation.

While the invention has been shown and described with reference to several embodiments it will be understood by those skilled in the art that various changes and modifications may be made thereto witout departing from the spirit of the invention which is meant to be limited only by the scope of the claims annexed hereto.

We claim:

1. A stirrer adapted for use in a diagnostic procedure in which a plurality of discrete specimen particles are to be continuously reoriented in a random manner while suspended in a pool of pressurized fluid where they are exposed to an incident beam of electromagnetic radiation penetrating the pressurized fluid, the stirrer comprising:

means for producing a composite magnetic field centered on the particles in the pressurized fluid with field components being orthogonally related to each other and with each component varying in strength over time in a predetermined order, said means comprising:

respective electromagnetic coils arranged in proximity to the particles and the fluid, various coils being selectively energizable to provide a respective field component that interacts magnetically with particles that are magnetic particles so that magnetic particles interact directly with the field component while other particles interact with said magnetic particles and/or with said fluid.

2. The stirrer set forth in claim 1 wherein at least two of the electromagnetic coils are arranged in a plane common to two intersecting axes coincident with respective coil axes.

3. The stirrer set forth in claim 2 wherein one of said electromagnetic coils is arranged along another axis perpendicular to said plane.

4. The stirrer set forth in claim 1 wherein said field components have equal strength.

5. The stirrer et forth in claim 1 wherein each coil produces field strength inversely related to the coils' distance from the geometric center of the particles in the pool of fluid.

6. The stirrer set forth in claim 1 wherein each coil is mounted in fixed relation to the particles in the pool of fluid.

7. The stirrer set forth in claim 1 wherein said coils are mounted on a support structure from which a cell containing said particles and said fluid can be removed.

8. The stirrer set forth in claim 1 wherein said coils are arranged concentrically about said particles and said pool of fluid.

9. The stirrer set forth in claim 1 wherein said beam contains x-rays.

10. A method for diagnosing a plurality of discrete specimen particles involving orienting and reorienting the particles in a random manner while they are immersed in a pool of host fluid where they are exposed to an incident beam of electromagnetic radiation penetrating the fluid in which the particles are suspended, the method comprising the steps of:

producing a composite magnetic field centered on the particles in the fluid with field components being orthogonally related to each other and with such components varying in strength over time in a predetermined sequential order by using respective electromagnetic coils arranged in proximity to the particles in the fluid, and energizing the coils to provide respective field components that interact magnetically with particles that are magnetic particles so that the magnetic particles interact directly with the field components while other particles interact with said magnetic particles and/or with said fluid.

11. A stirrer for perturbing quietude of a particle carrying fluid to impart collective particle reorienting motions to fluid borne particles, comprising:

means for imposing magnetic flux on fluid borne particles over a time period; and means for changing magnetic flux direction systematically throughout the time period between successive time intervals in which flux direction is maintained constant;

whereby fluid borne particles, but not necessarily all of them, respond to changes in flux direction by moving into new orientations under impetus from magnetic flux interaction with particles having sufficient particle magnetic moment, thereby resulting in time-successive collective particle reorientations in respective time intervals throughout the entire time period.

12. A method for perturbing quietude of a particle carrying fluid to collectively impart particle reorienting motions to fluid borne particles during a time period in which respective particles are given successive orientations during successive time intervals, the method comprising the steps of:

imposing magnetic flux on fluid borne particles over essentially the entire time period, without interrupting the imposition of the flux; and changing magnetic flux direction systematically between successive time intervals in each of which flux direction is maintained constant;

whereby fluid borne particles, but not necessarily all of them, respond to changes in flux direction by moving into new particle orientations under impetus from magnetic flux interaction with particles having sufficient magnetic moment, thereby resulting in time-successive, collective particle reorientations in respective time intervals throughout the time period.

13. A stirrer usable for stirring particles within a fluid pool comprising;

means for imposing magnetic flux on the particles in the pool; and means for repeatedly changing direction of the magnetic flux;

whereby the particles tumble through the fluid pool into successive orientations as particles having magnetic moment interact with the magnetic flux.

14. The stirrer recited in claim 13 wherein said means for imposing said magnetic flux comprises electromagnets oriented to produce magnetic flux in various directions.

15. The stirrer recited in claim 13 wherein said means for imposing said magnetic flux comprises a set of two axially aligned electromagnets to produce magnetic flux in opposite directions.

16. The stirrer recited in claim 15 wherein said means for imposing said magnetic flux further comprises another set of two axially aligned electromagnets to produce magnetic flux in opposite directions.

17. The stirrer recited in claim 13 wherein said means for varying the magnetic flux direction comprises electromagnets energizable in timed sequence to produce various flux directions.

18. A method for stirring fluid in a pool of particle laden fluid and thus randomizing particle orientations during a stirring period, comprising the steps of:

applying a magnetic field of arbitrary direction to the particles in the fluid for a sufficient time to allow individual magnetic particles to reorient themselves into alignment with the field's direction through interaction of magnetic field flux with such particles; and changing magnetic field direction systematically and successively to allow individual magnetic particles to repeatedly orient themselves in successive new orientations under influence of the field direction through interaction of field flux with such particles;

whereby particles in the fluid attain randomized orientations whether they are magnetic or nonmagnetic particles.

* * * * *